7570X
S. H. Long,
Steam-Boiler Fire-Tube.
Patented May 6, 1833.
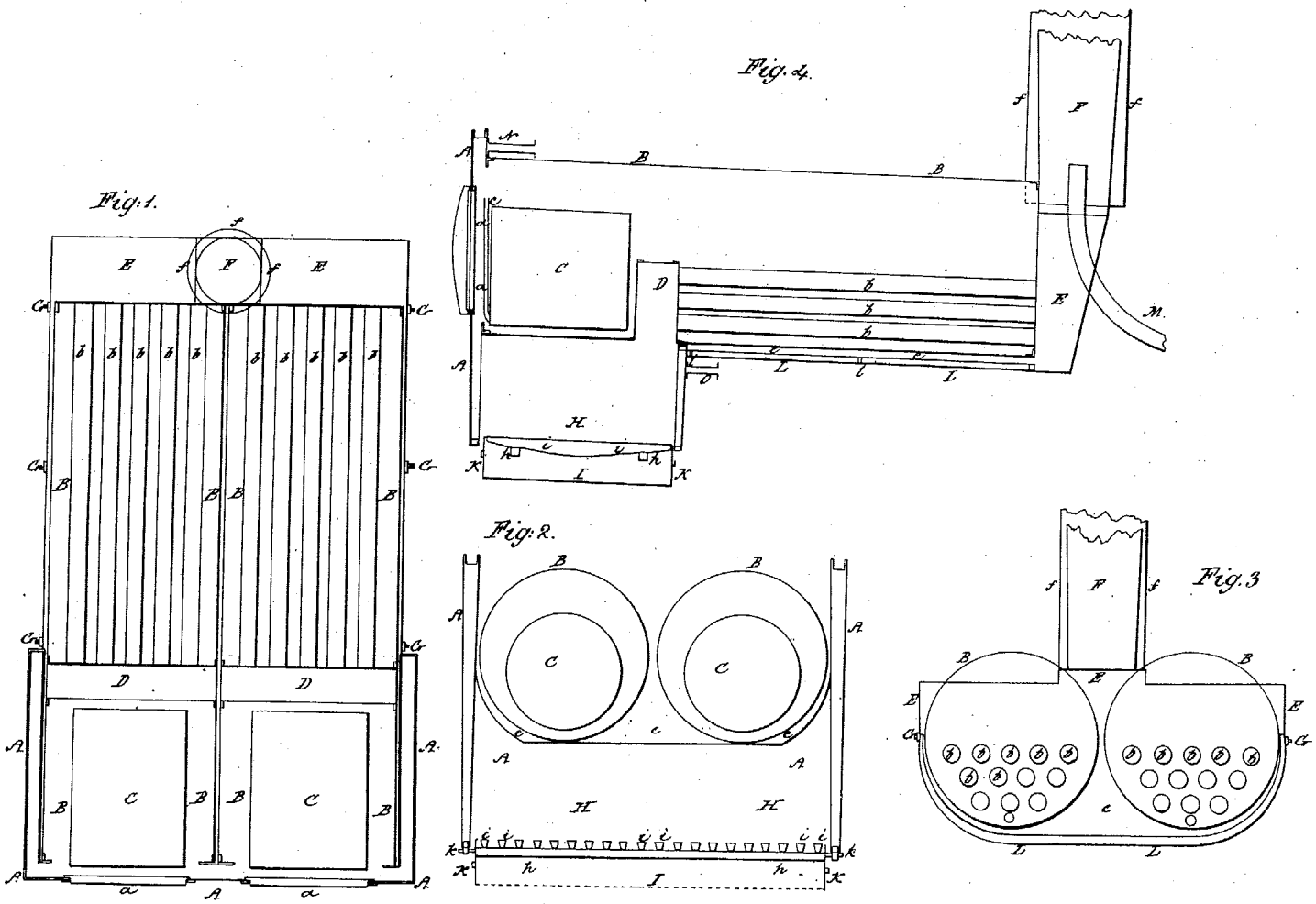
AM. PHOTO-LITHO. CO. N.Y. (OSBORNE'S PROCESS.)

Ar. 12
May 6 1833

7570X

Stephen H. Long U. S. Army

Letters Patent

The schedule referred to in these Letters Patent and making part of the same containing a description in the words of the said Stephen H Long of his improvement in the construction of Boilers or Steam Generators and of Wheels for Locomotive Steam Engines To all to whom these presents shall come. Be it known that I Stephen H Long of the United States Army have invented certain new and useful improvements in the construction of Boilers or Steam Generators and of wheels for the Pennsylvania Locomotive and other Locomotive Steam engines and that the following is a full and exact description of my said improvements. In addition to my improvements in the construction of Boilers as specified in the first item of my letters patent under date of December 28th 1832. I claim the following improvements in the construction of Boilers and other apparatus appended to them as new and useful, to wit, 1st the introduction of flues or tubes passing longitudinally through that portion of each cylindrical boiler situated in rear of the fire place. In order to admit of this arrangement the lower half of each boiler is intercepted by a niche recess or Notch of any convenient width lengthwise of the boiler (say four to eight inches) and rising from the lower part or side of the boiler to a line or plane passing horizontally through the boiler at or a little below its centre. The sides of this niche or recess will of course be nearly semi circular and should be parallel to each other. the rearward of the fire place being perforated with holes in which the tubes or flues are inserted. and that towards the front of the fire place being of similar form but destitute of perforation for the reception of flues. The space above and between the sides of the niche presents a plane surface constituting a portion of the boiler. Hence those portions of the Boiler situated immediately above the

7570X fire place are destitute of flues while those back of the fire place are
supplied with a greater or less number of flues according to the size
of the cylinders of which the steam generator or boiler is composed
which flues are contained in a segment of each cylinder occupying the
lower half of the same. In that portion of each cylinder situated
immediately above the fire place a smaller cylinder of sheet iron
tin or copper serving as a steam chamber may be inserted. This
cylinder may be of a size as large as can be admitted through the
man-holes into that portion of the cylindrical boiler between the
front and the neck in which there are no flues or tubes
The object of the small cylinder is not only to enlarge the steam room
but to exclude from the boiler a considerable portion of the water which
would otherwise be required. A free communication between the
interior of each small cylinder and the upper part of the boiler in
which it is situated is afforded by means of a tube rising from the
bottom of the former and opening into the top or steam room of the
latter — 2nd I also claim as a new and useful improvement
in the construction of boilers for locomotive engines the introduction
of a fire box adapted to two or more cylindrical boilers to be con
structed and applied in the following manner viz. The front sides
and back of the box are of the usual construction so far as relates
to those portions of the same that are situated below the cylin
drical boilers. The back sides nearly or quite to the bottoms of these
boilers
The sides may rise to any convenient height not lower than a line
or plane passing through the centre of the same. The front may
rise three to six inches or more above the tops of the Cylindrical
Boilers. This as well as the other sides of the fire Box is constru
ted of two plates or sheets of iron of suitable thickness confined
at suitable intervals asunder by means of stay bolts and other
customary fastenings. The interior sheet or plate of the front
is perforated with circular openings corresponding to each cyl
indrical boiler of a diameter about two inches less than that of
the interior of the boiler. This plate is attached to the front ends of

7570X all the cylindrical boilers by means of rivets or stay bolts passing through the plate and through a flange about one inch wide turned inwardly at the front end of each boiler and made continuous quite round the interior periphery of the boiler. Thus confined and afterwards calked in the usual manner. The plate forms a steam tight junction with the boilers. The exterior plate of the front is also perforated with openings after the manner of man Holes in front of each boiler and corresponding to them respectively.

Thus arranged the front of the fire box will serve not only as a steam generator but as a conduit through which the water will be conveyed into the cylindrical boilers in a manner to keep them equally supplied and will at the same time subserve the purposes of a steam way leading ^mainly^ from the cylindrical boilers but from the fire box to the main steam pipe through which the steam is conducted to the working Cylinders. The front of the fire box is also perforated as usual by one or more fire doors of suitable dimensions In reference to the arrangements of ^the^ different parts of the boiler or steam generator as above contemplated it should be remarked that the chimney is situated at the rear or back end of the cylindrical boilers or at the end farthest from the fire place. also that the water to supply the boilers is conveyed from the force pump through a tube which enters the back of the fire box a little below the cylindrical boilers —

3[d] I also claim as a new and useful improvement in the construction of boilers for the purposes already mentioned, the application of an apron situated in rear of the fire box beneath the cylindrical boilers and about one inch from them which apron may pass horizontally beneath the boilers and the space or spaces between them and may rise either in a curve or in an oblique right line or plane from beneath the bottom of each exterior boiler to a horizontal plane passing through the centres of the cylindrical boilers. The margins of the apron may be attached to the outside of the boilers as also to the back of the fire box by means of screw bolts or otherwise,

7570 X

The space between the boilers and ^the apron is intended as a flue
through which a portion of the heated air &c is conveyed from
the fire place to the chimney
The construction of the apron may be as follows. Two or more ribs
of bar iron about one inch square are formed by bending them into
a shape corresponding to a transverse section of the apron
These ribs are to be disposed in such a manner that one of them may
occupy a position immediately back of the fire box and another
a position directly below the rear or back end of the boilers the
residue should more than two be required occupying positions in
termediate to those above designated all the ribs being parallel to
each other. and having their ends attached to the outsides of the boil
ers on the lines of contact between them and the margins of the
apron — Upon these ribs both externally and internally thin sheets of
iron are fastened by means of rivets passing through the ribs and the
sheets. The space ~~or space~~ or spaces between the sheets which spaces are
of a thickness or depth equal to that of the ribs is filled with a lu-
ting or mortar of pounded charcoal and clay consisting of about
three parts of the former to one of the latter or with some other
suitable nonconductor of heat. The flue between the boilers &
the apron as also the tubular flues within the cylindrical boil
ers all open into a smoke box situated at the back end of the boil
ers from whence the smoke &c together with waste steam from the
working cylinders and from the safety valve are ejected vertical
ly through a chimney rising from the top of the smoke box.
The chimney is formed of two parts one of which is firmly attached
to the smoke box and rises about eight feet above it and the other
includes the former being of larger size and of such a construction
as admits of its being moved upward and downward on the part first
mentioned. The moveable part of the chimney is furnished with appro
priate apparatus and fixtures by means of which it may be readily
elevated or depressed at the pleasure of the person in attendance accord
ing as he may find it expedient in passing under bridges or through tunnels. or for the purpose of increasing the draft through the fire place. 4th I moreover claim as a new and useful improvement in the construction of boilers for steam engines the discovery and application of a grate adapted to the use of Anthracite coal. The construction of the grate is as follows viz. The grate bars are included in a square or rectangular and moveable frame of sheet iron about one fourth of an inch thick and of such dimensions in other respects that it may enter freely into the lower part of the fire box heretofore described. The sides of the frame may be about five inches in depth of which about two inches are made to enter the fire box. the grate bars are supported within the frame on bearers of iron extending quite across the frame and resting in two of its opposite sides. The position of the bearers with respect to the grate bars is rectangular beneath them and at or within about six inches of their ends. The bearers are of a square or rectangular form supporting the grate bars upon one of their sides respectively. One or both of the bearers is furnished with a journal at each end passing through the side of the grate frame by means of which an oscillatory movement may be communicated to one or both of the bearers by means of a winch or wrench applied to some part of the bearer either exteriorly or interiorly of the frame as may be found most convenient. By means of the oscillation of one or both bearers a vibratory motion is communicated to the grate bars which motion is rendered alternate between all the contiguous bars in consequence of the corners of the bearer on its upper or bearing side being alternately truncated immediately beneath each grate bar The ends or journals of one of the bearers protrude through and beyond the sides of the grate frame far enough to enter steps or supports attached to the lower part of the sides of the fire box in which steps the bearer is allowed to [illegible] and serves as an axle for the grate. By this means one side or end of the grate (together with the ash pan which is attached to the lower edge of the grate frame) may be let down at pleasure for the purpose of discharging at once the contents of the fire place. and again elevated for the reception of a new

7570X charge of fuel. This operation is facilitated by the aid of lever rods and pivots appropriately adjusted for the purpose 5th. I moreover claim as a new and useful improvement in the construction of wheels for Locomotive steam engines the application of hubs of cast iron in connexion with wooden wheels each hub being formed of two similar portions or segments of a circular form and of suitable diameter and thickness adapted to each other by means of a socket in one of the segments fitted for the reception of an annular tenon projecting from the inner side of the other segment through both of the single passes transversely of the hub or in the direction of its axis. On the exterior segment of the hub and outward by thereof is a ring or box incorporated with the hub and surroun ding the axle. This box is [illegible] by two slots or mortises dia metrically opposite to each other made for the reception of a key which passes through the axle and serves as a linch pin to confine the wheel to the axle (Both segments of the Hub may be furnished with the boxes and slots just described if deemed advisable.

The interior portions of the hub in addition to the socket and annular tenon before mentioned consist of a cylindrical box surrounding the axle and oc cupying the space in each segment. between the socket or tenon and the slotted ring or box also of a number of dividing partitions equal to the number of spokes in the wheel, which box and partitions are also incorporated with and constitute portions of each segment. the partitions extending from the box outwardly to the periphery of the hub. Two segments thus formed and firmly connected by means of screw-bolts in such a manner that their [illegible] partitions may come into direct contact or nearly so with each other constitute the hub or nave of the wheel. the openings or spaces between the partitions [illegible] as receptacles for the spokes. and the screw bolts by which the seg ments are bound together passing through these receptacles as also through the spokes. The spokes and felloes of the wheel are construc ted in the usual manner of wooden wheels except in so far as relates to the adjustment of the former to the hub — The tire or binding of the wheel consists of three parallel circular concentric bands or tires of wrought or malleable iron of the following description viz 1st The flat [illegible] tire occupying the outward or tread side of the wheel rim and extending at least half the distance across it. The exterior surface of this tire presents a cylindrical or slightly taper form. The main tire is attached to the fellies by nails or screw bolts with conical heads the latter being inserted in holes of a corresponding shape made in the tire for their reception and the body of the nail or bolt being driven into or through the felly. 2nd The sloped tire is formed of a bar of wrought Iron or steel whose transverse section is a square or [illegible] [illegible] the least depth or side of which exceeds the thickness of the flat tire by at least one quarter of an inch or by a difference corresponding to the difference in the lengths of the two rails of the rail way on portions of the road where the most abrupt curves or curves of the least radius occur. The width of the sloped tire should not exceed that of the flat tire and is such as to occupy that portion of the periphery of the rim uncovered by the flat tire. Note 1st The flat tire is first driven upon the rim from the face or outside of the wheel after which the sloped tire is driven from the opposite side of the wheel into close contact with the flat tire.

Both of these tires having been applied to the wheel their exterior surfaces are dressed by turning or otherwise into the shape best adapted to the curvatures of the road the flat tire being made cylindrical or nearly so and the sloped tire being dressed in a manner to present transversely of the wheel a gentle curve rising gradually from the surface of the flat tire and becoming more abrupt as it approaches the wheel flange. — Note 2nd The flat and sloped tires together constitute the entire wheel tread which instead of the two portions or parts first mentioned may be formed of a single band or tire of wrought iron moulded into the same or a similar shape with respect to its exterior surface as that presented by both portions combined.

3rd The flange tire is also of wrought iron about four inches in depth and about 3/4 — inch in thickness. This part is of a washer

7570X like form and is applied as usual to the interior flange side of the wheel
in such a manner that its exterior periphery may protrude about one inch
beyond the sloped tire or 1 1/4 inch beyond the flat tire or cylindrical
part of the wheel – The flange tire is forced into close firm contact with the sloped
tire (or with the main tire when a single band is used or substituted for
for the flat and sloped tires) and with the fellies of the wheel by means
of screw bolts passing through the flange and the fellies at a suitable distance
from and within the other parts of the tire. To the wheel constructed
in the manner above described I give the name of the triple banded
Wheel when the tire of the wheel consists of three parts, and of the double
banded Wheel when the tire consists of two parts only as explain
ed in Note 2. — The improvements described in this specification
and specially claimed as new and useful are. 1st The application
of two or more horizontal cylindrical boilers to Locomotive Steam engines
with flues leading through a portion of each and at the same time
one or more flues leading in the same direction exteriorly of the
boilers or between them and the apron. 2nd The use of two or
more horizontal cylindrical boilers with tubular flues in connex
ion with the fire Box. 3rd The introduction and use of steam
chambers disposed in such a manner as to enlarge the steam
room within the boilers while they serve to reduce the quantity of
water necessarily contained in the boilers — 4th The construction
of a grate with one or more oscillating bearers, the better to promote
the combustion of Anthracite Coal or Coke — 5th a new meth
od of causing a Grate to traverse on an axle by means of which
the fire Place may be speedily discharged of its contents.
6th The construction and application of a moveable or slip chim
ney on a new plan. and 7th a new method of constructing
wheels for locomotive ~~and~~ steam engines. all of which improve
ments are exemplified in the drawings herewith annexed and the models herewith presented and are
further illustrated by the following explanations and references Explanation of the Drawings Fig 1. A horizontal section of the Steam Generator on a plane.

passing near the axes or centres of the cylindrical Boilers.

Fig 2. A Transverse vertical section of the Steam Generator passing through the fire place grate. cylindrical steam chambers &c.

Fig 3. A Transverse vertical section of the steam generator in rear of the fire place and between the fire box and the smoke box Fig 4. A vertical section longitudinally of the steam generator and near the axis or centre of one of the cylindrical Boilers References to the Drawings and Models.

A. The fire box communicating freely with the cylindrical boilers a. man holes or openings through the front of the fire box and communicating with the interior of the cylindrical Boilers B. The cylindrical boilers containing tubular flues in rear of the fire places and cylindrical steam chambers within the fire box.

b. The tubular flues.

C. The steam chambers communicating with the upper part of the boilers by means of the tube c (see fig 4)

D. Notches in the cylindrical boilers affording a communication between the fire place and the tubular flues E. The smoke box at the back end of the boilers - e the flue beneath the boilers F. The standing part of the chimney attached to the smoke box f. The slip or moveable part of the chimney G. Screw Bolts passing through the ribs of the apron and confining the same to the boilers H. The fire Place and Grate h. the bearers upon which the grate bars i rest. one or both of, which may be oscillating on journals as at k I. The ash Pan K. The sides of the grate frame L. The apron with its ribs as at l.

M. The waste steam pipe entering vertically into the chimney.

N. The Steam pipe leading from the Boiler to the working cylinders.

7570X

O. The supply pipe for conveying water into the boiler

P. The wheel with its appropriate fixtures

In testimony that the above is a true specification of my said improvements as aforementioned I have hereunto set my hand and seal this 21st day of February A.D. 1838.

Witnesses

Jacob P. Wolfe

J. Badger

Stephen H. Long.

3804 nos (Gr in portfolio)